United States Patent [19]
Morizot et al.

[11] Patent Number: 5,427,518
[45] Date of Patent: Jun. 27, 1995

[54] INSTALLATION FOR THE PRODUCTION BY DRAPING OF MULTILAYER STRUCTURES FORMED FROM COMPOSITE MATERIALS

[75] Inventors: Richard A. P. Morizot, Villemer; Jean-Yves M. Nioche, St Maurice Montcouronne, both of France

[73] Assignee: Societe Nationale d'Etude et de Construction de Moteurs d'Aviation SNECMA, Paris, France

[21] Appl. No.: 79,943

[22] Filed: Jun. 23, 1993

[30] Foreign Application Priority Data

Jul. 2, 1992 [FR] France .................. 92 08142

[51] Int. Cl.$^6$ ............. B29D 9/00; B32B 31/04; B32B 31/20
[52] U.S. Cl. ................ 425/504; 100/211; 156/245; 156/285; 156/382; 156/500; 156/556; 156/583.3; 264/511; 264/546; 425/342.1; 425/343; 425/388; 425/390; 425/515; 425/DIG. 19
[58] Field of Search ............. 156/382, 583.3, 538, 156/581, 222, 285, 539, 556, 558–559, 563, 245, 286, 307.1, 307.4, 500; 264/510–511, 571, 101, 546, 553, DIG. 50, DIG. 57, DIG. 64, DIG. 66, DIG. 78; 425/387.1, 388–390, 504, 515, 518, 342.1, 343, DIG. 19; 414/225; 100/211

[56] References Cited

U.S. PATENT DOCUMENTS

| | | | |
|---|---|---|---|
| 4,052,241 | 10/1977 | Walter | 156/285 X |
| 4,875,962 | 10/1989 | Breakspear | 156/245 |
| 5,092,954 | 3/1992 | Braun et al. | 156/539 X |
| 5,264,058 | 11/1993 | Hoagland et al. | 156/285 X |
| 5,282,911 | 2/1994 | Natorff et al. | 156/382 X |

FOREIGN PATENT DOCUMENTS

| | | |
|---|---|---|
| 0271263 | 6/1988 | European Pat. Off. |
| 2604475 | 9/1976 | Germany |
| WO89/08541 | 9/1989 | WIPO |

*Primary Examiner*—Adrienne Johnstone
*Attorney, Agent, or Firm*—Oblon, Spivak, McClelland, Maier & Neustadt

[57] ABSTRACT

In order to produce multilayer structures of composite materials by draping precut elementary layers on a shaping mold, an installation is proposed which comprises, apart from the mold, a gripping tool which can e.g. be fitted on the articulated arm of a robot. The shaping mold comprises a flexible membrane equipped with suction cups ensuring the gripping of the elementary precut layers. A vacuum circuit makes it possible to engage the membrane on a countermold placed behind the latter in order to shape the grasped elementary layer. When the tool is brought onto the mold, a pressure source acts on the membrane in order to compact the elementary later on the mold. A suction system keeps the layer on the mold following the release of the suction by the cups.

8 Claims, 3 Drawing Sheets

INSTALLATION FOR THE PRODUCTION BY DRAPING OF MULTILAYER STRUCTURES FORMED FROM COMPOSITE MATERIALS

BACKGROUND OF THE INVENTION

1. Field of the Invention

The invention relates to an installation which makes it possible to produce in an automated manner multilayer structures of composite materials by draping precut elementary layers on a shaping mold.

2. Discussion of the Related Art

Composite material structures are being used ever more frequently, particularly in the aeronautical and space industries. This evolution is explained both by the weight saving resulting from the use of such structures and by their remarkable mechanical properties. Thus, the textile fibers forming the weft of the composite materials can be oriented at random during the manufacture of the structures, so as to give the latter an increased mechanical strength in directions which are subject to the greatest mechanical stresses.

Usually composite material structures are produced from elementary layers, generally known as "plies, formed from resin-preimpregnated textile fibers, e.g. of the thermosetting type. As a function of the particular case, the fibers of each of the elementary layers can be juxtaposed, parallel fibers oriented in a given direction, or can form a fabric in which the fibers are oriented in two different directions.

The elementary layers are superimposed or stacked during the draping operation after which the structure obtained is compacted and then rigidified, e.g. by raising the temperature up to the resin polymerization temperature, when the latter is thermosetting.

During the production of such multilayer structures of composite materials, the draping operation is the most difficult, because it requires the putting into place in a very accurate manner of each of the elementary layers, both with regards to the orientation thereof and with regards to its positioning on the preceding layers.

In view of this difficulty, the draping stage is usually performed manually (in more than 90%), on the basis of elementary layers precut by a cutting machine. As a result the quality and reproducibility of the parts obtained are of a random nature and the parts are expensive (draping generally represents approximately ⅓ to ½ of the price of the part obtained).

For the production of large parts such as aircraft wings, use is sometimes made of draping machines, like that described in FR-A-2 620 081. These particularly complex and costly machines both cut and put into place the elementary layers from wound strips. The rolls containing these strips, the cutting members and the placing members are carried by an orientable head, which moves and is oriented above the shaping mold in accordance with a predetermined program. However, such machines are extremely expensive and their use is difficult, which has hitherto limited their use to the production of large parts for which manual draping is especially difficult.

In addition, FR-A-2 511 656 discloses a draping installation in which each of the previously cut, elementary layers is maintained by suction on a transfer belt, which brings the layer above the shaping mold. A vacuum produced between the transfer belt and the mold then makes it possible to apply the elementary layer to the mold, so as to ensure both its shaping and its putting into place. However, this installation requires the intervention of an operator in order to bring each of the elementary layers onto the transfer belt and accurately position the same on the belt with the aid of a template placed below the belt in the area used for the putting into place of the precut elementary layers. Although this installation makes it possible to partly automate the draping operation, it does not eliminate the disadvantages of manual draping in connection with the difficulties encountered in obtaining high quality, reproducible manufacture.

EP-A-271 263 also discloses an installation incorporating a tool making it possible to grip an elementary layer or a stack of resin-preimpregnated layers on a cutting table, the preshaping of the layer or stack on a countermold belonging to the tool, followed by its transfer and draping on a shaping mold. The tool comprises a flexible membrane which, in the inoperative state, adopts the shape of the countermold. The introduction of compressed air into the space formed between the membrane and the countermold ensures gripping due to the adhesion of the preimpregnated layers. Preshaping is then obtained by forming a vacuum in the aforementioned space. The space is then again connected to a compressed air source, so as to deposit the layers on the shaping mold and the tool is progressively removed from the latter.

This installation makes it possible to completely automate the draping operation. However, it is only usable when the elementary layers are preimpregnated with resin and adhere to the membrane and to the shaping mold.

SUMMARY OF THE INVENTION

The invention specifically relates to an installation of a novel type making it possible to carry out in an entirely automatic manner the gripping of the precut elementary layers, which may or may not be impregnated with resin, their shaping and their compacting, in a perfectly reproducible manner and making it possible to guarantee the quality of the parts obtained without the costs being prohibitive, for multilayer structures of composite materials of small and medium sizes.

The invention therefore specifically relates to an installation for the production of multilayer structures of composite materials by draping precut elementary layers incorporating a shaping mold and a gripping, shaping and compacting tool having a support, a countermold, complimentary of the shaping mold, mounted on the support, a flexible membrane fixed at its periphery to an edge of the support facing the countermold, means for creating a vacuum between the countermold and the flexible membrane and means for pressing the membrane against the shaping matrix, wherein the membrane is fixed to a planar edge of the support in such a way that it is not normally in contact with the countermold and wherein the membrane is provided with vacuum gripping suction cups on its face to the countermold.

In such an installation, the gripping tool is advantageously mounted on transfer means such as an articulated arm of a robot, making it possible to move the tool between an elementary preset layer gripping station and a draping station incorporating the shaping mold. It is therefore possible to carry out draping in a completely automated manner without having to use a complex, costly draping machine, while guaranteeing both the quality and the reproducibility of the structures obtained.

According to a preferred embodiment of the invention the tool also has suction means which can be connected to the suction cups.

Preferably, the flexible membrane and the countermold form between them a closed space communicating by passages with a collector formed in the support and opposite to the membrane with respect to the countermold. The means for creating a vacuum between the countermold and the membrane then comprise vacuum producing means which can be connected to the collector. In comparable manner, the means for pressing the shaping membrane incorporate a pressure source which can be connected to the collector.

In this configuration, each of the suction cups is advantageously connected to at least one suction compartment by a flexible tube traversing the countermold so as to be able to slide within the latter during the deformation of the membrane. This suction compartment is placed in the collector and communicates with the suction means.

In order to permit a satisfactory positioning of the gripping tool with respect to the cutting machine and the shaping mold, the support of the tool preferably has an abutment surrounding the flexible membrane and projecting beyond its first face. The abutment can tightly abut against an abutment surface surrounding a shaping surface of the shaping mold.

In order to further improve the positioning of the tool with respect to the shaping mold, the tool support is advantageously provided for cooperating with centering means associated with said mold.

For holding the precut elementary layers on the shaping mold during the release of the gripping means associated with the flexible membrane, the shaping surface of the mold is provided, at least in its central part, with perforations connected to second suction means.

BRIEF DESCRIPTION OF THE DRAWINGS

The invention is described in greater detail hereinafter relative to a non-limitative embodiment and with reference to the attached drawings, wherein show.

DESCRIPTION OF THE PREFERRED EMBODIMENTS

Figure 1:
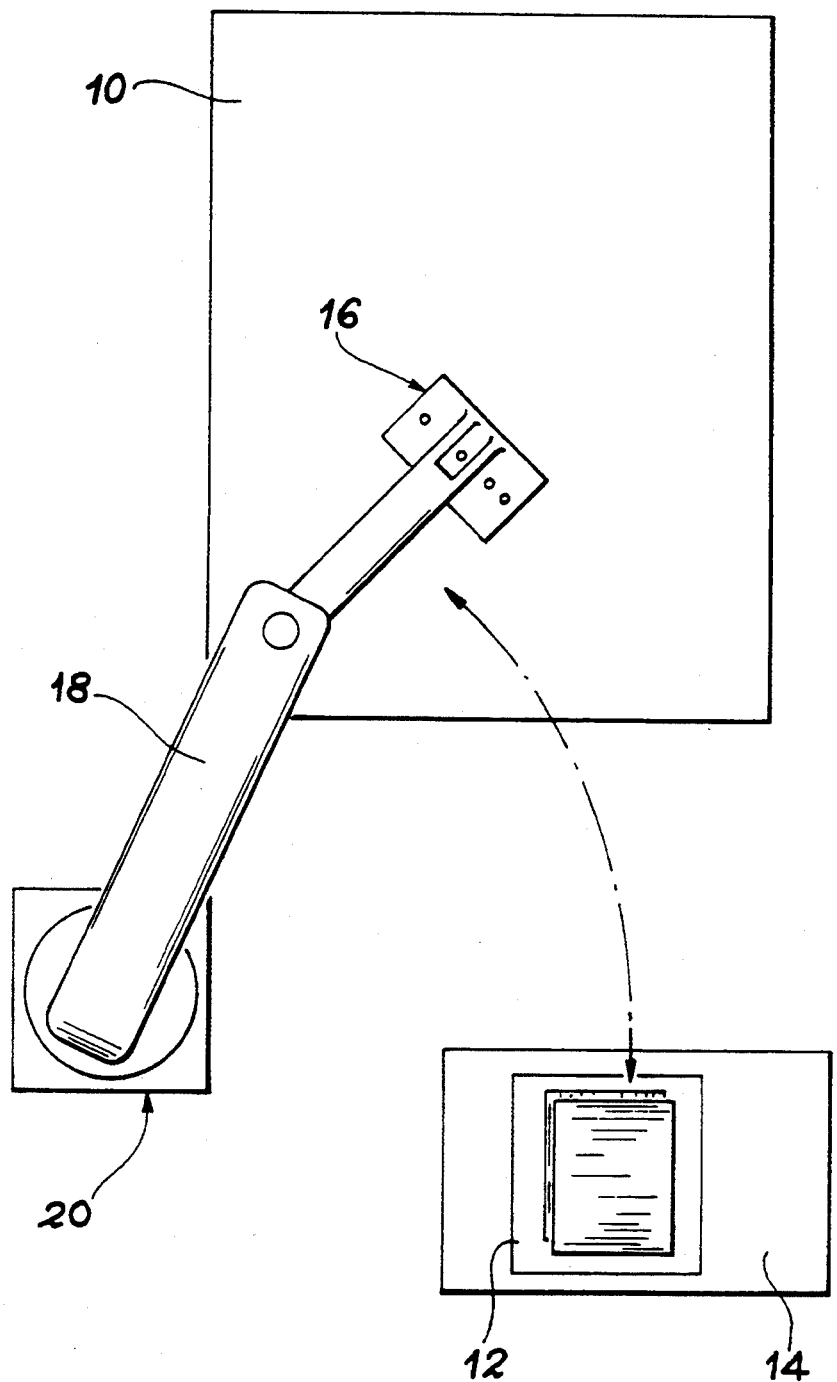
FIG. 1 A plan view diagrammatically illustrating an installation according to the invention.

In FIG. 1, reference numeral 10 designates the discharge table of a cutting machine such as a fluid jet or ultrasonic knife cutting machine, which receives the elementary parts, which do not have a protective film, cut to the desired shape from a continuous strip formed from textile fibers preimpregnated with resin, e.g. of the thermosetting type. These precut elementary parts serve to form the successive layers of a multilayer, composite material structure, by draping the precut elementary layers on a shaping mold 12 located at a draping station 14 in the vicinity of the table 10.

The invention proposes an installation making it possible to automatically carry out the gripping of the precut elementary parts on the table 10, their shaping and their compacting on the mold 12. This installation essentially comprises a gripping tool 16, which is to be mounted on a transfer means such as an articulated arm 18 of a robot 20. The installation is completed by the shaping mold 12.

The structure of the gripping tool 16 will now be described in detail relative to FIG. 2. The gripping tool 16 comprises a body or support 22, which in section has a shape comparable to that of the mold 12, but whose dimensions are slightly larger. On its face to be turned towards the elementary part to be grasped and towards the mold 12, the support 22 has a recess 24 in which is fixed a countermold 26 having an active face 26a complimentary of the shaping surface 12a of the mold 12. A frame 27 is also fixed in the recess 24 around the countermold 26.

Around the recess 24 the support 22 forms a peripheral rib 23, terminated by a planar edge to which is tightly fixed the periphery of a flexible, tight membrane 28. The arrangement of the membrane 28 is such that it is not normally in contact with the outer active face 26a of the countermold 26. The fixing of the membrane 28 to the planar edge of the peripheral rib 23 is brought about by gripping by means of an annular abutment 30, whose contour corresponds to that of the rib 23 and which is fixed to the planar edge of the latter by screws 32. This abutment 30 projects over a given distance beyond the active outer face of the membrane 28.

The closed space 34 formed between the membrane 28 and the countermold 26 communicates with a tight collector 38 by passages 36 formed in the frame 27 and in the support 22 around the countermold 26. The collector 38 is formed in the support 22 at a location close to the recess 24 in which is received the countermold 26, but opposite to the membrane 28 with respect to the countermold. As illustrated in FIG. 2 access to the collector 38 can be facilitated by the presence of a detachable cover 40 fixed by screws 42, the sealing of the collector being maintained by means of a gasket 44.

A first tube 46 formed in the cover 40 connects the collector 38 to a vacuum surface 48 making it possible to place both the collector 38 and the closed space 34 under a vacuum. A second tube 50 formed in the cover 40 connects the collector 38 to a pressure source 52 by means of which a compacting pressure can be introduced into the collector 38 and into the closed space 34.

The cover 40 also has a third tube 54 connected to a valve 56. This normally closed valve 56 then guarantees the sealing of the collector 38. Its opening, controlled following the putting into operation of the vacuum circuit 48 and after the putting into operation of the pressure source 52 makes it possible to either break the vacuum, or release the compacting pressure.

In order to permit gripping by the membrane 28 of the precut elementary layers, the membrane is equipped on its active outer face with suction cups 58. These suction cups are distributed at regular intervals over the entire active surface of the membrane, so as to permit the gripping of elementary layers of different shapes and sizes.

Each of the suction cups 58 is connected by a flexible tube 60 to a suction compartment 62 located within the collector 38. This compartment 62, which is completely tight with respect to the collector 38, can in particular be carried by the cover 40, which then has another tube 64 by which the compartment 62 is connected to a vacuum source 66 making it possible to establish a vacuum in the compartment 62 ensuring the gripping of an elementary layer by the suction crops 58.

Each of the flexible tubes 60 traverses the countermold 26 and that part of the support 22 located between the countermold and the collector 38 by a passage 68 authorizing the sliding of the flexible tube. This passage 68 is oriented perpendicular to that part of the active face 26a of the countermold 26 on which it issues. Moreover, the part of the active face 26a coincides with the location in front of which is positioned the corresponding suction cup 58, when the membrane 28 is engaged against the active face 26a under the effect of a vacuum in the closed space 34 as a result of the vacuum circuit 48.

At least in their part closest to the membrane 28, the flexible tubes 60 are preferably internally reinforced by a metal fitting, so as to prevent any jamming of the tubes between the membrane and the countermold.

Figure 2:
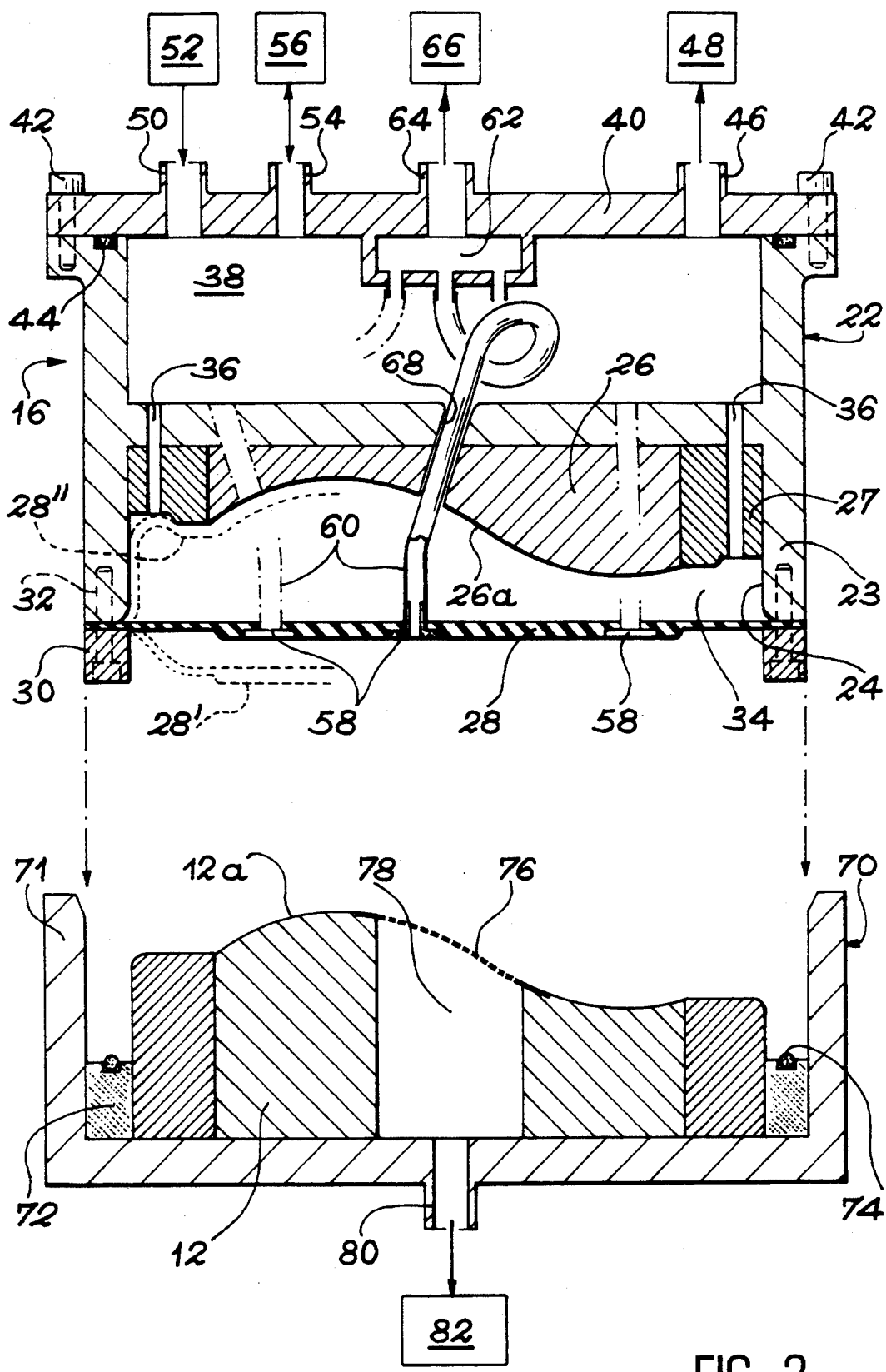
FIG. 2 A vertical sectional view showing the gripping tool and the shaping mold of the installation illustrated in FIG. 1.

Although only a single suction compartment 62 is shown in FIG. 2, it should be noted that several compartments of this type can be provided on the gripping tool 16, each of the compartments being connected to a suction cup group 58 corresponding to a given region of the membrane 28. Such an arrangement makes it possible to separately put into place several juxtaposed elementary layers during the same operation.

It should also be noted that the only function of the collector 38 is to permit free movements of the flexible tube 60 and the housing of the suction compartment or compartments 62.

The installation according to the invention also comprises the shaping mold 12, whose structure will now be described with reference to FIG. 2.

Like the countermold 26, the shaping mold 12 is mounted on a support 70 placed in static manner at the draping station 14. Around the shaping mold, the support 70 forms a collar 71, whose internal section is complimentary of the external section of the abutment 30 and the rib 23 of the support 22 on which the abutment is fixed. This characteristic makes it possible to ensure a very precise positioning of the gripping tool 16 relative to the mold 12.

Within the collar 71 and around the shaping mold 12 is formed an abutment surface 72, provided with a gasket or packing 74, on which bears the abutment 30 when the gripping tool 16 is fitted into the collar 71 of the support 70. When contact is established, the space formed between the membrane 28 and the mold 12 is tight with respect to the outside.

This latter property is exploited in order to keep the elementary layers deposited on the mold 12 by a vacuum established in the space from the shaping surface 12a of the mold 12. For this purpose, the shaping surface 12a is provided, at least in its central part, with a perforated sheet 76 behind which is located a collector 78 connected to a vacuum circuit 82 by a tube 80 formed in the support 70.

The use of the installation according to the invention will now be described with successive reference to FIGS. 3A to 3D.

Figure 3A:
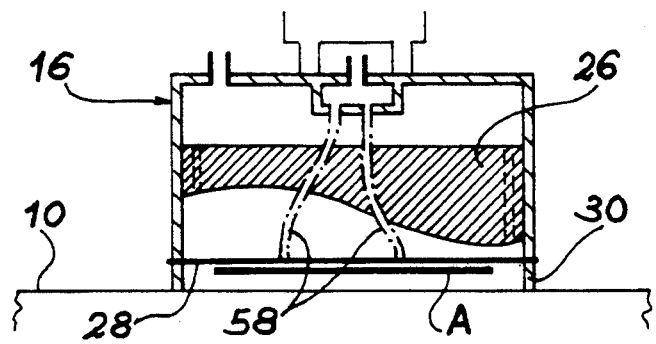
FIGS. 3A, 3B, 3C and 3D diagrammatically and in part vertical section four successive stages of using the installation according to the invention.
Figure 3B:
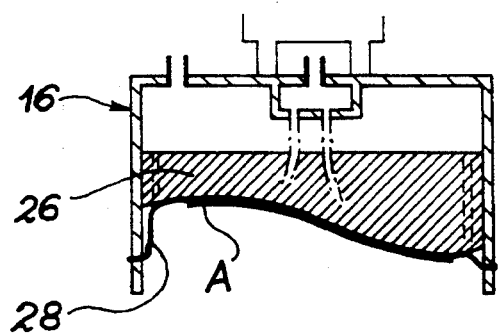

At is diagrammatically illustrated by FIG. 3A, when the gripping tool 16 is brought by the articulated arm 18 (FIG. 1) above a precut elementary layer A resting on the table 10, the abutment 30 bears on the table 10 and ensures a stable positioning of the tool with respect to the table. The vacuum circuit 66is then put into operation, so as to ensure the gripping of the elementary layer A by the suction cups 58. Under the effect of the pressure, the membrane 28 deforms in order to assume the position indicated at 28' in FIG. 2.

The suction means 48 are then put into operation, the valve 56 being closed. The membrane 28 then deforms in order to bear on the active face 26a of the countermold 26, as is diagrammatically illustrated by FIG. 3B and as is illustrated at 28'' in FIG. 2. The elementary layer A grasped by the tool 16 then has the shape which it requires in the structure to be produced. It should be noted that this shaping operation can entirely take place prior to any movement of the articulated arm 18 or, preferably, during the movement, so as to avoid any loss of time.

Figure 3C:
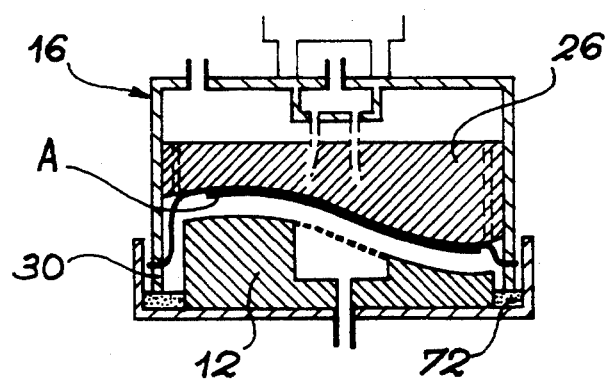

When the gripping tool 16 is positioned vertically of the shaping mold 12 and lowered until the abutment 30 abuts against the abutment surface 72, as is diagrammatically illustrated in FIG. 3C, a precise positioning of the precut elementary layer A relative to the mold 12 is ensured. The operation of the vacuum source 48 is then interrupted and the vacuum within the collector 38 and the closed space 34 is broken by a brief opening of the valve 56.

Figure 3D:
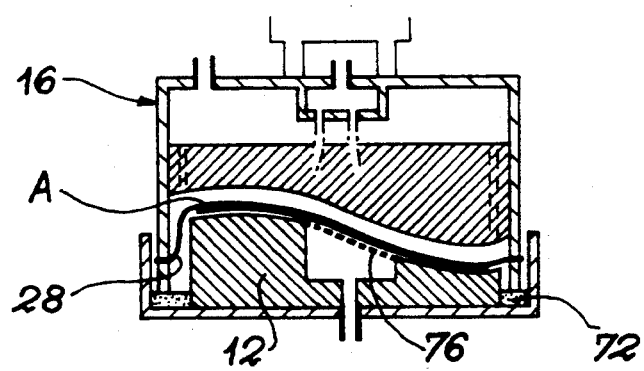

After closing the valve 56 again, the precut elementary layer A is compacted by actuating the pressure source 52. The elementary layer A is then engaged against the mold 12 by the pressure acting on the opposite face of the membrane 28. This situation is illustrated in FIG. 3D.

The vacuum source 66 is then interrupted and the elementary layer A is maintained on the mold 12 by operating the vacuum source 82. Under these conditions, the tool 16 can be freed from the mold 12 and brought above the table 10 by the articulated arm 18, in order to seek the following elementary layer of the multilayer structure being produced.

The above description clearly shows the essential advantages of the installation according to the invention. Thus, this installation makes it possible in an entirely automated manner to carry out the gripping of the precut elementary layers and drape them on the shaping mold, in order to produce a multilayer structure of composite materials. The automated character of these operations leads to a significant improvement to the quality and reproducibility of the thus obtained structures. Moreover, the installation according to the invention is particularly simple and inexpensive, which is an important advantage compared with existing draping machines.

What is claimed is:

1. An installation for producing multilayer structures of composite materials by draping precut elementary layers, the installation comprising:
   a shaping mold;
   a gripping, shaping and compacting tool comprising a support;
   a countermold complimentary to the shaping mold and mounted on the support of the tool;
   a flexible membrane facing the countermold and having a periphery which is fixed to a planar edge of the support of said tool, wherein the membrane is fixed to the planar edge of the support so as to be spaced from the countermold in a first position of said membrane;
   vacuum means, operatively cooperating with the tool, for creating a vacuum between the countermold and the membrane so as to cause the membrane to contact the countermold in a second position of the membrane;

pressing means, operatively cooperating with the tool, for pressing the membrane against the shaping mold;

vacuum gripping suction cups provided at a plurality of spaced locations on the membrane; and suction means connected to the suction cups, said suction means being operatively connected to the tools;

wherein the flexible membrane and the countermold define between them a closed pace communicating by passages with a collector formed in the support, which is opposite to the membrane with respect to the countermold, and each of the suction cups is connected to at least one suction compartment placed in the collector and communicating with the suction means by a flexible tube traversing be countermold so as to slide within the countermold during a deformation of the membrane.

2. The installation according to claim 1, wherein the vacuum means for creating a vacuum between the countermold and the membrane incorporate vacuum producing means which can be connected to the collector, and the pressing means for pressing the membrane against the shaping mold incorporate a pressure source which can be connected to the collector.

3. The installation according to claim 1, wherein the support has an abutment surrounding the flexible membrane and projecting beyond the flexible membrane.

4. The installation according to claim 3, wherein the abutment can abut tightly against an abutment surface surrounding a shaping surface of the shaping mold.

5. The installation according to claim 1, wherein the support can cooperate with centering means associated with the shaping mold.

6. The installation according to claim 1, wherein the shaping mold has a shaping surface provided, at least in a central part, with perforations connected to second suction means.

7. The installation according to claim 1, wherein the tool is mounted on transfer means which is able to move the tool between a precut elementary layer gripping station and a draping station incorporating the shaping mold.

8. An installation for producing multilayer structures of composite materials by draping precut elementary layers, the installation comprising:

a shaping mold;

a gripping, shaping and compacting tool comprising a support;

a countermold complimentary to the shaping mold and mounted on the support of the tool;

a flexible membrane facing the countermold and having a periphery which is fixed to a planar edge of the support of said tool, wherein the membrane is fixed to the planar edge of the support so as to be spaced from the countermold in a first position of the membrane;

vacuum means, operatively cooperating with the tool, for creating a vacuum between the countermold and the membrane so as to cause the membrane to contact the countermold in a second position of the membrane;

pressing means, operatively cooperating with the tool, for pressing the membrane against the shaping mold;

vacuum gripping suction cups provided at a plurality of spaced locations on the membrane; and suction means connected to the suction cups, the suction means being operatively connected to the tool;

wherein the support comprises a collector, and at least one suction compartment is positioned in the collector, each of the suction cups being connected to the at least one suction compartment and communicate with the suction means by a flexible tube which traverses the countermold and is slidable within the countermold during a deformation of the membrane.

* * * * *